US012558804B2

(12) United States Patent
Kamikawa et al.

(10) Patent No.: US 12,558,804 B2
(45) Date of Patent: Feb. 24, 2026

(54) MOBILE BODY

(71) Applicant: SONY GROUP CORPORATION, Tokyo (JP)

(72) Inventors: Yasuhisa Kamikawa, Tokyo (JP); Yasunori Kawanami, Tokyo (JP); Eisuke Ohshima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 342 days.

(21) Appl. No.: 18/248,638

(22) PCT Filed: Aug. 30, 2021

(86) PCT No.: PCT/JP2021/031788
§ 371 (c)(1),
(2) Date: Apr. 11, 2023

(87) PCT Pub. No.: WO2022/085305
PCT Pub. Date: Apr. 28, 2022

(65) Prior Publication Data
US 2023/0373111 A1 Nov. 23, 2023

(30) Foreign Application Priority Data
Oct. 19, 2020 (JP) ................................. 2020-175659

(51) Int. Cl.
*B25J 19/06* (2006.01)
*B25J 5/00* (2006.01)

(52) U.S. Cl.
CPC ................ *B25J 19/06* (2013.01); *B25J 5/00* (2013.01)

(58) Field of Classification Search
CPC .......... B25J 19/06; B25J 5/00; B25J 19/0091; B62D 57/032
See application file for complete search history.

(56) References Cited

U.S. PATENT DOCUMENTS

2025/0108524 A1* 4/2025 Wang ................... B62D 57/032

FOREIGN PATENT DOCUMENTS

| EP | 1081026 A2 * | 3/2001 | .......... B25J 19/0091 |
| JP | 2001-239479 A | 9/2001 | |
| JP | 2005-161437 A | 6/2005 | |
| JP | 2012-125404 A | 7/2012 | |
| JP | 2016-074060 A | 5/2016 | |
| JP | 2018-134291 A | 8/2018 | |
| WO | 2012/066678 A1 | 5/2012 | |
| WO | 2020/183875 A1 | 9/2020 | |

OTHER PUBLICATIONS

International Search Report and Written Opinion of PCT Application No. PCT/JP2021/031788, issued on Nov. 16, 2021, 12 pages of ISRWO.

* cited by examiner

*Primary Examiner* — Saul Rodriguez
(74) *Attorney, Agent, or Firm* — CHIP LAW GROUP

(57) ABSTRACT

There is provided a mobile body including a mobile body main body, a movable unit that is attached to the mobile body main body and provides propulsive force to the mobile body main body, and a buffer attached to a surface of the mobile body main body. The buffer includes a deep layer material that covers the surface of the mobile body main body, and a surface layer material provided at a position more distant from the surface of the mobile body main body than the deep layer material. The surface layer material has a modulus of repulsion elasticity lower than the deep layer material.

15 Claims, 8 Drawing Sheets

[FIG. 1A]
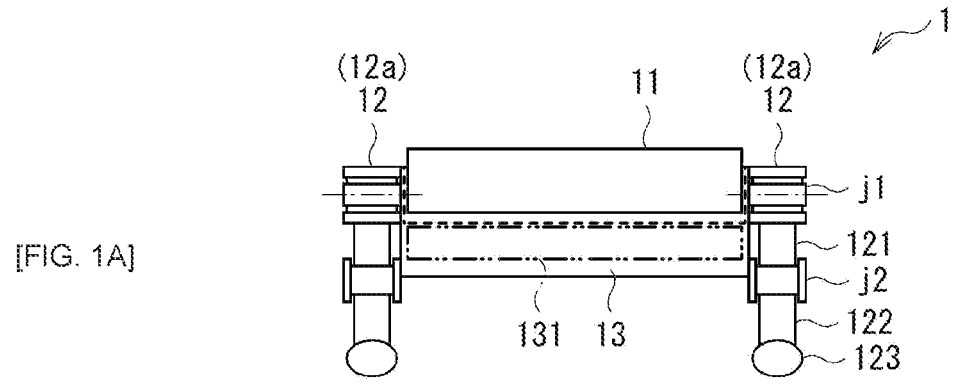
[FIG. 1B]
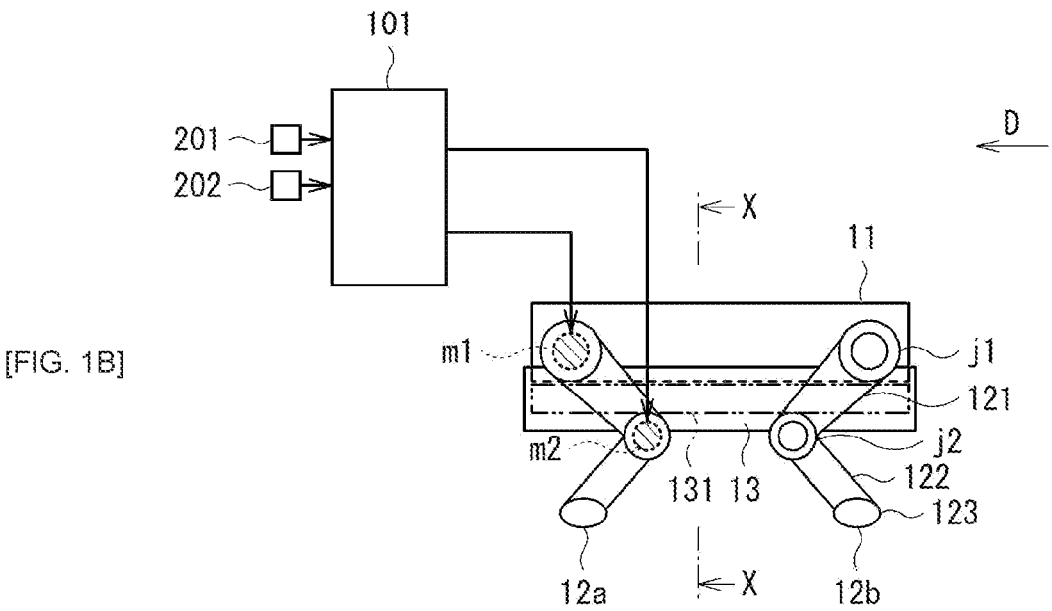

[FIG. 2]
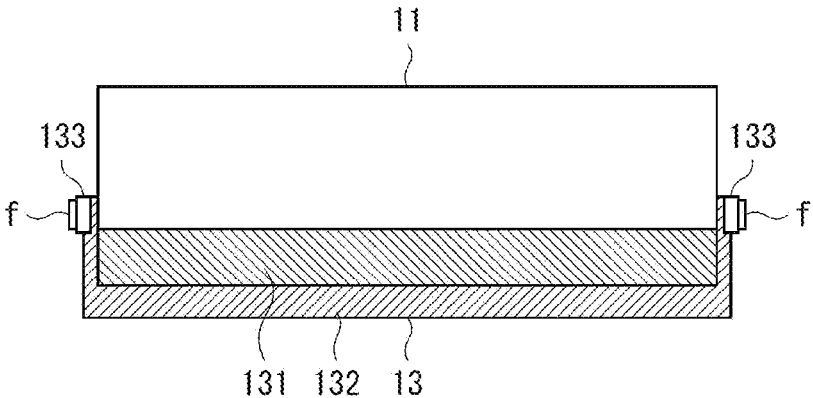
[FIG. 3A]
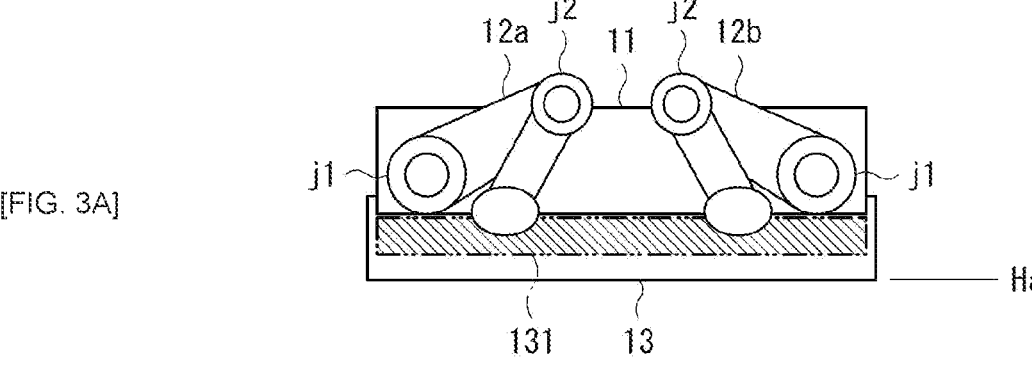
[FIG. 3B]
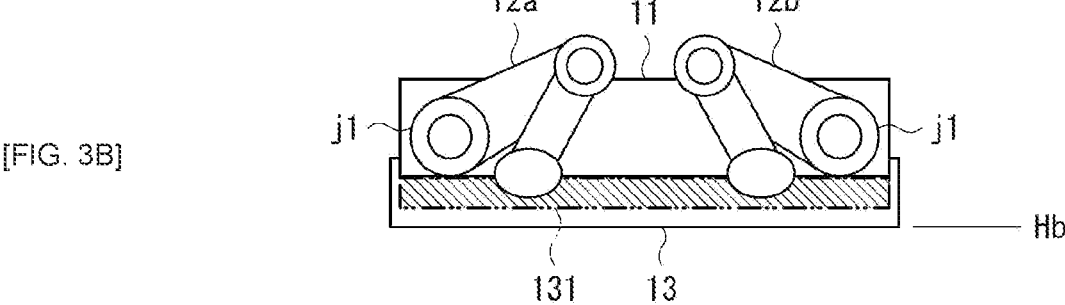

[ FIG. 4 ]
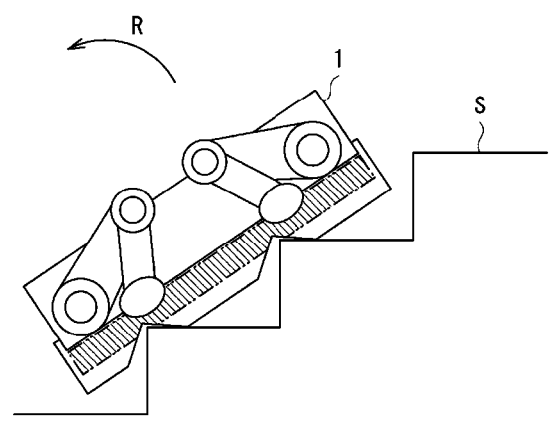
[ FIG. 5 ]
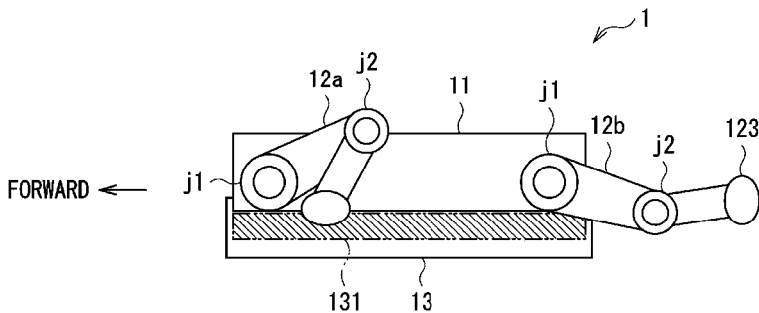

[ FIG. 6 ]
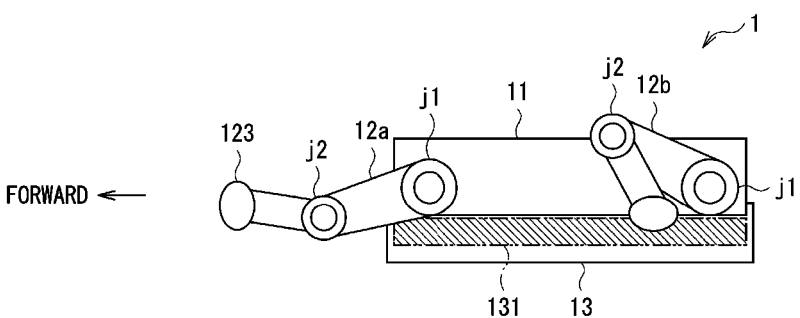
FORWARD
[ FIG. 7 ]
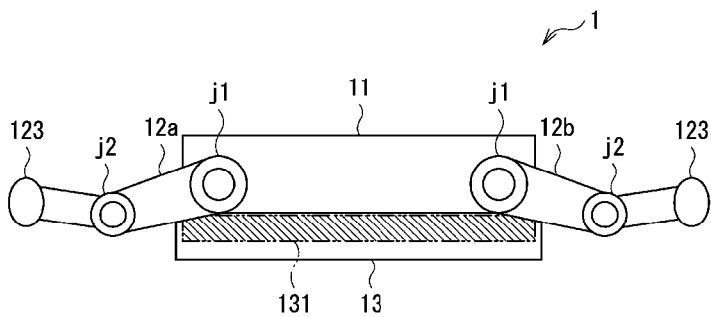

[ FIG. 8 ]
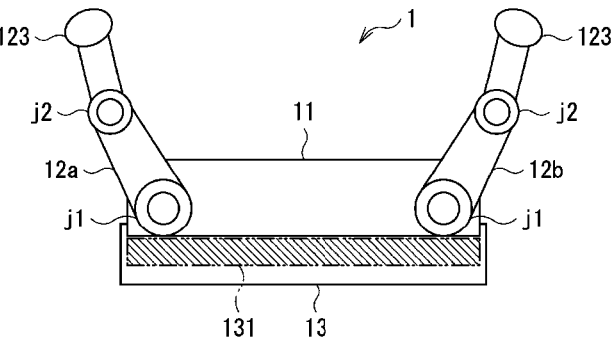
[ FIG. 9 ]
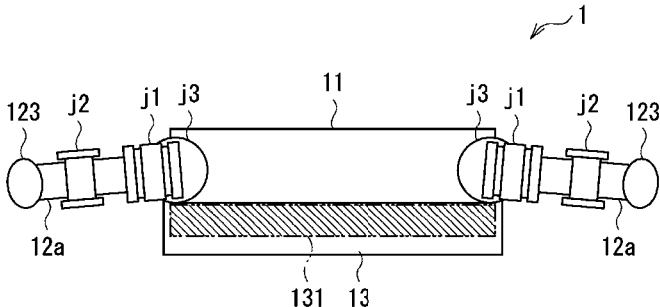

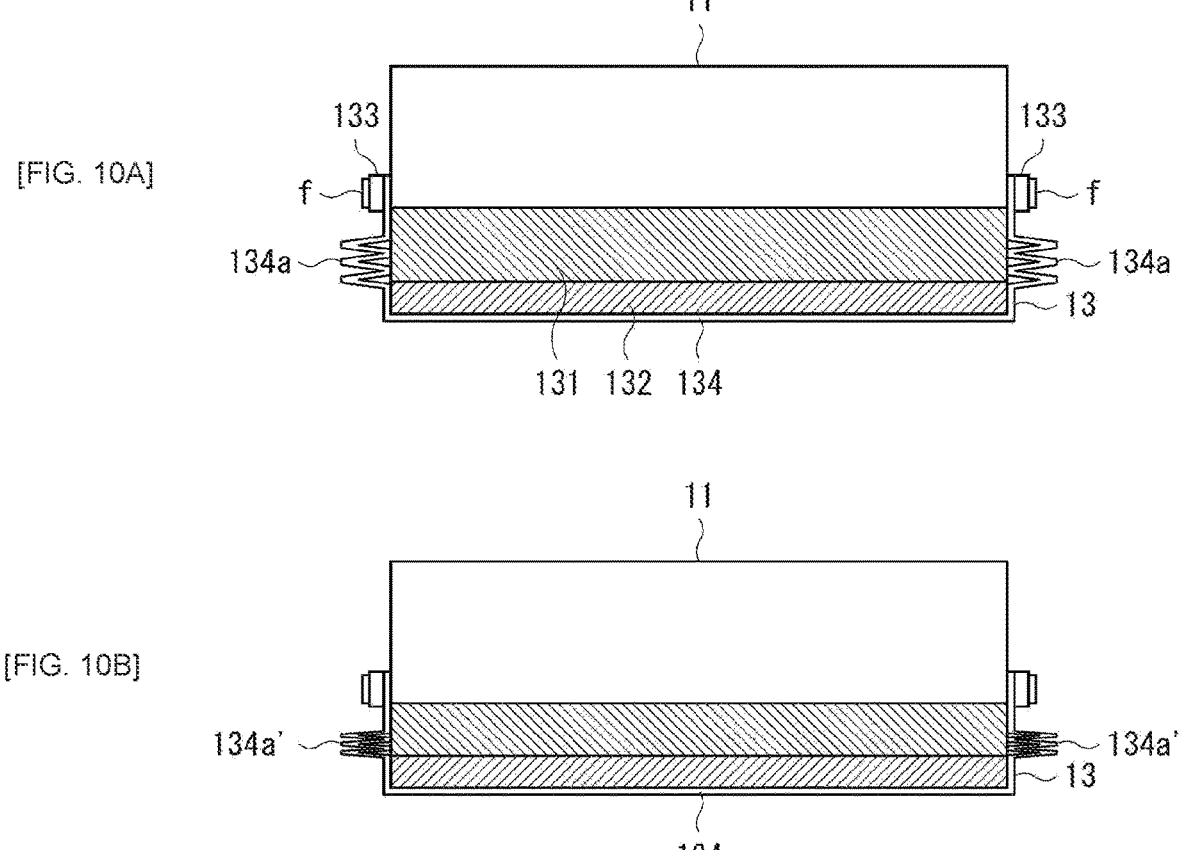
[FIG. 10A]
[FIG. 10B]

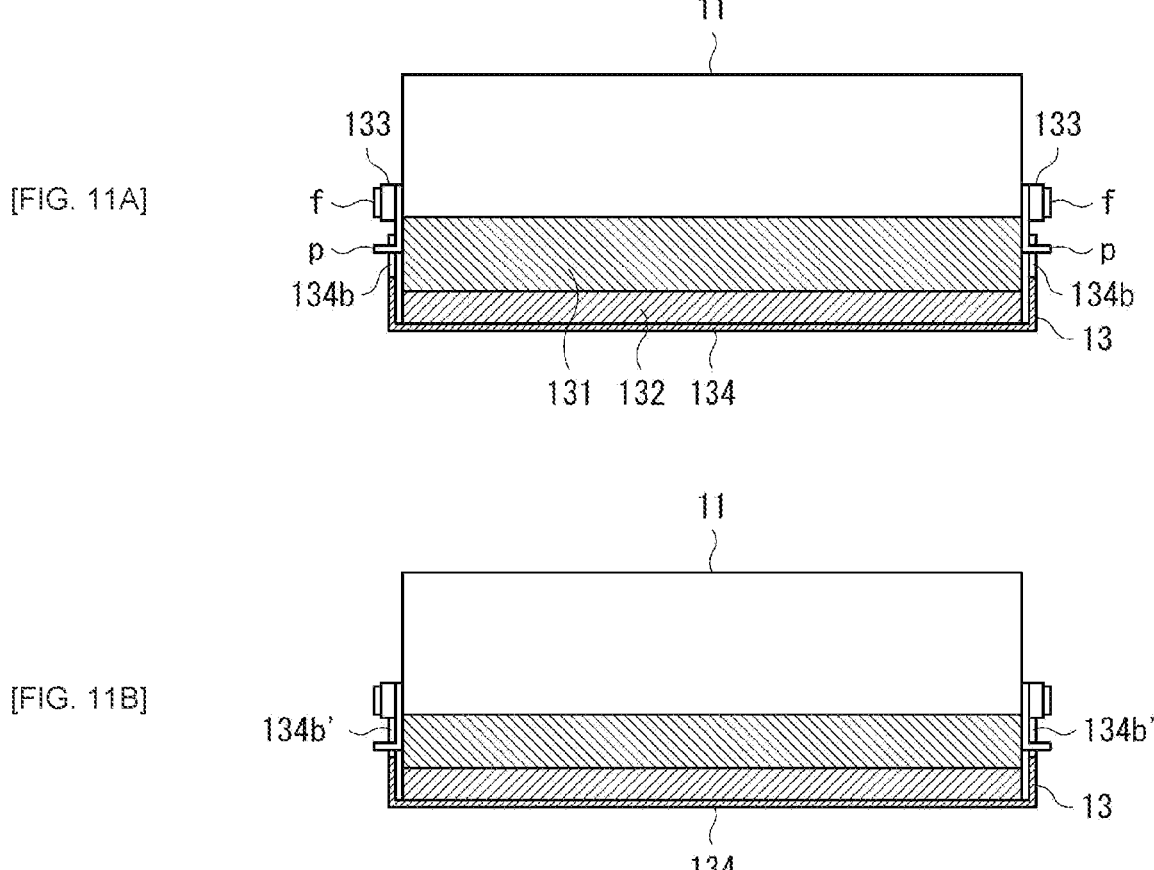
[FIG. 11A]
[FIG. 11B]

[FIG. 12A]
[FIG. 12B]
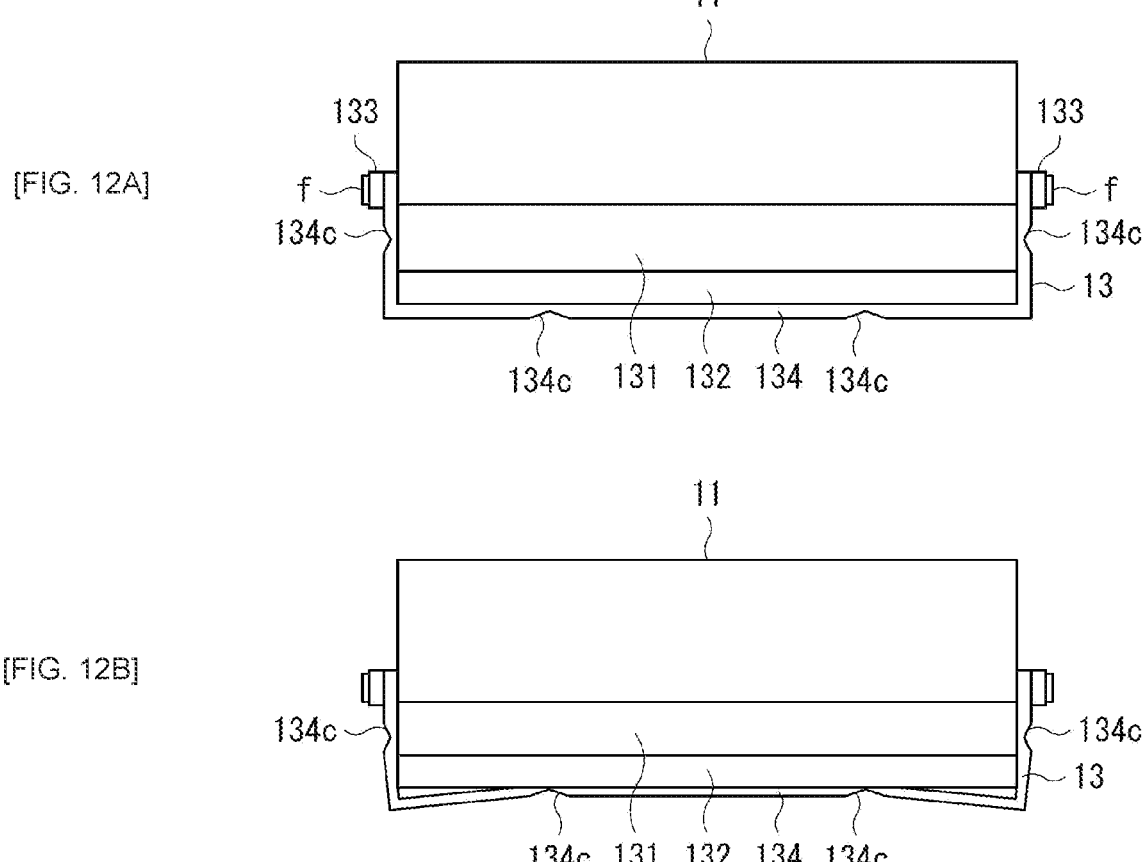

MOBILE BODY

CROSS REFERENCE TO RELATED APPLICATIONS

This application is a U.S. National Phase of International Patent Application No. PCT/JP2021/031788 filed on Aug. 30, 2021, which claims priority benefit of Japanese Patent Application No. JP 2020-175659 filed in the Japan Patent Office on Oct. 19, 2020. Each of the above-referenced applications is hereby incorporated herein by reference in its entirety.

TECHNICAL FIELD

The present disclosure relates to a mobile body including a buffer structure.

BACKGROUND ART

Buffering has been performed upon a collision by utilizing elastic deformation of a flexible member disposed on a portion of a mobile body expected to collide. Examples of a material to be used for the buffering member include a low-hardness material such as a foamed material (PTL 1).

CITATION LIST

Patent Literature

PTL 1: Japanese Unexamined Patent Application Publication No. 2018-134291

SUMMARY OF THE INVENTION

A certain effect is expectable from a low-hardness material in terms of buffering. Meanwhile, however, there is repulsion associated with restoration after deformation, caused by an action of an internal elastic element, and this repulsion causes a retroaction in a mobile body after a collision. Thus, it is desired to suppress such a retroaction.

It is therefore desirable to provide a mobile body that makes it possible to achieve buffering as well as to suppress a retroaction after a collision.

A mobile body according to an embodiment of the present disclosure includes: a mobile body main body; a movable unit that is attached to the mobile body main body and is configured to provide propulsive force to the mobile body main body; and a buffer attached to a surface of the mobile body main body. In the present embodiment, the buffer includes a deep layer material that covers the surface of the mobile body main body, and a surface layer material provided at a position more distant from the surface of the mobile body main body than the deep layer material. The surface layer material has a modulus of repulsion elasticity lower than the deep layer material.

BRIEF DESCRIPTION OF THE DRAWINGS

FIG. 1A is a front view of an overall configuration of a mobile body according to a first embodiment of the present disclosure, FIG. 1B is a side view thereof.

FIG. 2 is a cross-sectional view of configurations of a mobile body main body and a buffer of the mobile body according to the first embodiment, and illustrates a cross-section taken along a line X-X in FIG. 1B.

FIGS. 3A and 3B are schematic diagrams illustrating a state of the mobile body according to the first embodiment; FIG. 3A illustrates a state where a leg mechanism is folded before compression of the buffer, and FIG. 3B illustrates the state during maximum compression of the buffer.

FIG. 4 is a schematic diagram illustrating a state of the mobile body according to the first embodiment upon falling from a staircase.

FIG. 5 is a schematic diagram illustrating a state of a mobile body according to a first modification example of the first embodiment in a case where the leg mechanism is in an evacuated state.

FIG. 6 is a schematic diagram illustrating a state of a mobile body according to a second modification example of the first embodiment in a case where the leg mechanism is in the evacuated state.

FIG. 7 is a schematic diagram illustrating a state of a mobile body according to a third modification example of the first embodiment in a case where the leg mechanism is in the evacuated state.

FIG. 8 is a schematic diagram illustrating a state of a mobile body according to a fourth modification example of the first embodiment in a case where the leg mechanism is in the evacuated state.

FIG. 9 is a schematic diagram illustrating a state of a mobile body according to a fifth modification example of the first embodiment in a case where the leg mechanism is in the evacuated state.

FIGS. 10A and 10B are cross-sectional views of configurations of a mobile body main body and a buffer of a mobile body according to a second embodiment of the present disclosure using a cross-section similar to that in FIG. 2.

FIGS. 11A and 11B are cross-sectional views of configurations of a mobile body main body and a buffer of a mobile body according to a first modification example of the second embodiment.

FIGS. 12A and 12B are cross-sectional views of configurations of a mobile body main body and a buffer of a mobile body according to a second modification example of the second embodiment.

MODES FOR CARRYING OUT THE INVENTION

The following desscribes some embodiments of the present disclosure in detail with reference to the drawings. The embodiments described below are specific examples of the present disclosure and are not intended to limit the technology of the present disclosure to the following specific aspects. In addition, arrangement, dimensions, and dimension ratios of components in the following embodiments are not limited to the examples illustrated in the drawings.

The description is given in the following order.
1. First Embodiment
  1.1. Configuration of Mobile Body
  1.2. Configurations of Mobile Body Main Body and Buffer
  1.3. Operation of Mobile Body during Out-of-Control
  1.4. Workings and Effects
  1.5. Descriptions of Various Modification Examples
    1.5.1. First Modification Example
    1.5.2. Second Modification Example
    1.5.3. Third Modification Example
    1.5.4. Fourth Modification Example
    1.5.5. Fifth Modification Example 2. Second Embodiment
    2.1. Configuration and Operation of Mobile Body
    2.2. Descriptions of Various Modification Examples
        2.2.1. First Modification Example
        2.2.2. Second Modification Example
3. Summary

1. First Embodiment

<1.1. Configuration of Mobile Body>

FIG. 1A is a front view of an overall configuration of a mobile body 1 according to a first embodiment of the present disclosure, and FIG. 1B is a side view thereof.

The mobile body 1 according to the present embodiment, when roughly divided, includes a mobile body main body 11, a movable unit 12, and a buffer 13. In the present embodiment, the mobile body main body 11 corresponds to a "mobile body main body", the movable unit 12 corresponds to a "movable unit", and the buffer 13 corresponds to a "buffer".

The mobile body main body 11 includes a housing, and incorporates, in the housing, components such as a micro-computer configuring a controller 101 described later.

The movable unit 12 is attached to the mobile body main body 11, and provides propulsive force to the mobile body main body 11. The movable unit 12 includes a set of leg mechanisms provided spaced apart from each other in a moving direction D of the mobile body 1. Specifically, the movable unit 12 includes a front leg mechanism 12a and a rear leg mechanism 12b disposed behind the front leg mechanism 12a in the moving direction D. A pair of front leg mechanisms 12a and a pair of rear leg mechanisms 12b are each provided, with one on the right and one on the left.

The front leg mechanism 12a and the rear leg mechanism 12b have similar configurations. Thus, the configurations of these leg mechanisms 12a and 12b are described by representing the front leg mechanism 12a for the sake of convenience. In the present embodiment, the front leg mechanism 12a corresponds to a "first leg mechanism", and the rear leg mechanism 12b corresponds to a "second leg mechanism".

The front leg mechanism 12a is provided on each of the right and left sides of the mobile body main body 11, and is attached to the mobile body main body 11 via a proximal joint j1. The front leg mechanism 12a includes a first thigh part 121 and a second thigh part 122. The first thigh part 121 is coupled to the mobile body main body 11 via the proximal joint j1, and the second thigh part 122 is coupled to the first thigh part 121 via a distal joint j2. The proximal joint j1 and the distal joint j2 incorporate actuators m1 and m2, respectively. The proximal joint j1 is able to drive, using the actuator m1, the first thigh part 121 in a rotational direction about a first axis perpendicular to the moving direction D of the mobile body 1. The distal joint j2 is able to drive, using the actuator m2, the second thigh part 122 in a rotational direction about a second axis parallel to the first axis. The distal joint j2 enables the front leg mechanism 12a to be folded and enables the first thigh part 121 and the second thigh part 122 to overlap each other. Examples of employable actuators m1 and m2 may include an electric motor. In the present embodiment, the first thigh part 121 corresponds to a "first thigh part". The second thigh part 122 corresponds to a "second thigh part". The proximal joint j1 corresponds to a "first joint". The distal joint j2 corresponds to a "second joint". As for the front leg mechanism 12a (the same holds true also for the rear leg mechanism 12b), the first thigh part 121 may be rephrased as a "thigh" and the second thigh part 122 may be rephrased a "calf", from morphological similarity in organs in the actual biological body.

The buffer 13 is attached to a surface of the mobile body main body 11, and is used to achieve buffering of the mobile body 1 upon a collision. The buffer 13 is attachable to any of surfaces facing outward of the mobile body main body 11, i.e., any one or a plurality of the front surface, rear surface, right surface, left surface, top surface, and undersurface. In the present embodiment, the buffer 13 is attached to the undersurface of the mobile body main body 11. This allows the buffer 13 to mitigate an impact on the mobile body 1 in a case where the mobile body main body 11 receives an impact upon falling from the undersurface thereof as a result of the mobile body 1 losing control of the movable unit 12.

In addition to those described above, the mobile body 1 includes the controller 101 configured to be able to control an operation of the movable unit 12. In the present embodiment, the controller 101 corresponds to a "controller". The controller 101 is implementable, for example, by a micro-computer including a central processing section, a storage section such as a ROM and a RAM, and an input/output interface section.

The controller 101 receives inputs of detection signals from various sensor units 201 and 202. On the basis of control information indicated by the detection signals, the controller 101 controls the actuators m1 and m2 provided, respectively, in the respective proximal and distal joints j1 and 2 of the front leg mechanism 12a and the rear leg mechanism 12b, to thereby control the attitudes, orientations, and operations of the front and rear leg mechanisms 12a and 12b. In particular, in the present embodiment, the controller 101 detects lost control of the movable unit 12, in other words, the movable unit 12 being in an out-of-control state during movement of the mobile body 1 by the movable unit 12, i.e., during walking by the front and rear leg mechanism 12a and 12b. In a case where detection is made that the movable unit 12 is in the out-of-control state, the controller 101 controls each of the front and rear leg mechanism 12a and 12b to be in an evacuated state. Here, the out-of-control state of the movable unit 12 refers to a state where the front and rear leg mechanisms 12a and 12b lose balance during walking, which actually causes a tumble, or which may cause a possible tumble in the future although no tumble yet occurs. Examples of employable sensor units may include a torque sensor 201 that detects torques outputted by the actuators m1 and m2 and an acceleration sensor 202 that detects acceleration of the mobile body 1. In the present embodiment, the input/output interface section of the controller 101 implements a "state detection section" that detects that the movable unit 12 is in the out-of-control state. The central processing section implements an "evacuation control section" that controls the front and rear leg mechanisms 12a and 12b to be in an evacuated state.

<1.2. Configurations of Mobile Body Main Body and Buffer>

FIG. 2 is a cross-sectional view of configurations of the mobile body main body 11 and the buffer 13 of the mobile body 1 according to the present embodiment, and illustrates a cross-section taken along a line X-X in FIG. 1B.

The buffer 13, when roughly divided, includes a deep layer material 131 and a surface layer material 132. In the present embodiment, the deep layer material 131 corresponds to a "deep layer material", and the surface layer material 132 corresponds to a "surface layer material".

The deep layer material 131 covers the surface of the mobile body main body 11; in the present embodiment, the deep layer material 131 covers the entire undersurface of the mobile body main body 11.

The surface layer material 132 is provided at a position more distant from the undersurface of the mobile body main body 11 than the deep layer material 131, and is superposed on an entire undersurface of the deep layer material 131. In the present embodiment, the surface layer material 132 covers, in addition to the undersurface of the deep layer material 131, all surfaces except the top surface, i.e., the front end surface, rear end surface, right end surface, and left end surface; the surface layer material 132 surrounds the entire deep layer material 131.

The deep layer material 131 and the surface layer material 132 are consistent with each other in that the materials 131 and 132 are both elastic members. However, the deep layer material 131 has a feature of relatively high flexibility (i.e., low Young's modulus), whereas the surface layer material 132 has a feature of relatively low modulus of repulsion elasticity (i.e., high viscosity). The deep layer material 131 preferably has a Young's modulus in a range from 5 kPa to 200 kPa to achieve secure buffering. In the present embodiment, the deep layer material 131 has a Young's modulus lower than that of the surface layer material 132, and the surface layer material 132 has a modulus of repulsion elasticity lower than that of the deep layer material 131. As an example, the deep layer material 131 has a Young's modulus of 12 kPa and a modulus of repulsion elasticity of 15% or more, and the surface layer material 132 has a Young's modulus of 74 kPa and a modulus of repulsion elasticity of about 5%.

In the present embodiment, examples of a material applicable to the deep layer material 131 may include foamed urethane, PORON®, an air cap, foamed styrene, and a corrugated cardboard. Examples of a material applicable to the surface layer material 132 may include HANENITE®.

In addition to those described above, the buffer 13 includes a fixture f that fixes the buffer 13 to the mobile body main body 11, and the surface layer material 132 is provided with a receiving part 133 that receives the fixture f. The fixture f is implementable by a bolt, and the receiving part 133 is implementable in the mode of an attachment plate. The attachment plate may be formed by a hard resin or a metal, and may be fastened to the surface layer material 132 by two-color molding for the resin and by heat sealing for the metal. Tightening force of the fixture f is exerted on the surface layer material 132 via the receiving part 133 to enable the buffer 13 to be fixed to the mobile body main body 11.

<1.3. Operation of Mobile Body During Out-of-Control>

FIGS. 3A and 3B are schematic diagrams illustrating a state of the mobile body 1 according to the present embodiment. FIG. 3A illustrates a state where both of the front and rear leg mechanisms 12a and 12b are folded before the compression of the buffer 13, and FIG. 3B illustrates the state during maximum compression of the buffer 13.

In the present embodiment, the movable unit 12 is configured to be switchable, during movement of the mobile body 1, between an extended state and a contracted state (i.e., a state in which the leg mechanism having a link mechanism structure is folded). In the movable unit 12 in the extended state, a leg tip 123 provided at each of the front and rear leg mechanisms 12a and 12b is present below the undersurface of the buffer 13 before the compression, as illustrated in FIGS. 1A and 1B. In FIG. 3A, a symbol Ha denotes a position of the undersurface of the buffer 13 before the compression. Meanwhile, in the contracted state, in contrast to the extended state, the proximal joint j1 of the front leg mechanism 12a is rotated rearward in the moving direction D of the mobile body 1, and the proximal joint j1 of the rear leg mechanism 12b is rotated forward. The respective distal joints j2 of the front and rear leg mechanisms 12a and 12b are rotated in directions opposite to the respective directions of the proximal joints j1. This causes the respective first thigh parts 121 and 121 of the front and rear leg mechanisms 12a and 12b to be displaced inwardly to be close to each other, and the respective second thigh parts 122 and 122 to be displaced outwardly to be away from each other, with respect to the respective distal joints j2. As illustrated in FIGS. 3A and 3B, in the contracted state, the front and rear leg mechanisms 12a and 12b are located above the undersurface of the buffer 13 before the compression. In particular, the leg tip 123 of each of the leg mechanisms 12a and 12b is present above the undersurface of the buffer 13 during maximum compression, as illustrated in FIG. 3B. In FIG. 3B, a symbol Hb denotes a position of the undersurface of the buffer 13 during the maximum compression.

Here, in the present embodiment, in a case where the movable unit 12 is in an out-of-control state, the front and rear leg mechanisms 12a and 12b are brought into an evacuated state by the controller 101, in particular, by the evacuation control section. Specifically, the front and rear leg mechanisms 12a and 12b are switched to the contracted state to thereby bring the mechanisms 12a and 12b into the evacuated state.

<1.4. Workings and Effects>

It has been common practice to dispose a flexible member at a location where a collision is expected to achieve buffering upon a collision. A low-hardness material such as a foamed material is known as a material used for the buffering member. However, buffering is expectable from the low-hardness material, although the low-hardness material may involve repulsion after deformation due to an action of an internal elastic element, thus causing occurrence of bouncing in some cases. For example, when the mobile body ascends a staircase, the mobile body may fall from the main body and slip down the staircase as a result of loss of control of the mobile body, specifically, loss of control of the movable unit. In that case, there is a possibility that the mobile body may collide with a person present at the foot of the staircase; in addition, an impact on the mobile body itself is also a concern. Meanwhile, it is conceivable to cover the undersurface of the mobile body with a foamable resin to thereby suppress the slippage of the mobile body after falling by utilizing friction of the resin while achieving buffering upon the falling. However, the elastic element existing inside the resin causes repulsion associated with restoration after deformation due to the falling. This generates a rotational moment about a fulcrum by a tangential force, thereby generating a tumble mode involving a forward rotation in the mobile body. In the present embodiment, it is possible to address such circumstances, absorb an impact without significantly inhibiting a motion capability of the mobile body, and to avoid an unintended tumble mode caused by the repulsion of the buffer member.

In the present embodiment, the buffering member provided in the buffer 13 is configured by the two layers of the deep layer material 131 and the surface layer material 132, and the surface layer material 132 having a relatively small modulus of repulsion elasticity is disposed on a side of the surface of the deep layer material 131. This makes it possible not only to achieve buffering but also to suppress a retroaction occurring in the mobile body 1 after a collision, and thus to protect the mobile body 1 from a collision more appropriately.

FIG. 4 is a schematic diagram illustrating a state of the mobile body 1 according to the present embodiment upon falling from a staircase.

In the present embodiment, it is possible to cause the entire buffer 13 to absorb an impact due to falling, and thus to mitigate the impact exerted on the mobile body 1 in a case where the control of the movable unit 12 is lost when ascending a staircase and the mobile body 1 falls from the mobile body main body 11. Further, it is possible to dissipate collision energy associated with the falling by utilizing viscosity of the surface layer material 132 disposed on the side of the surface of the deep layer material 131. This enables suppression of occurrence of a retroaction after the falling in the mobile body 1, thus making it possible to suppress occurrence of a tumble mode associated with a forward rotation (of which a direction is indicated by an arrow R in FIG. 4).

Here, causing the Young's modulus of the deep layer material 131 to be lower than that of the surface layer material 132 enables the deep layer material 131 to appropriately mitigate the impact upon the collision. Further, employing, as the material of the surface layer material 132, HANENITE® having a high Young's modulus and being relatively hard makes it possible not only to suppress a retroaction after the collision but also to cause the surface layer material 132 to also serve as a holding structure of the deep layer material 131.

Further, selecting, as the material of the surface layer material 132, a material having a low modulus of repulsion elasticity as well as a high friction coefficient makes it possible not only to suppress a retroaction after falling but also to suppress, for example, the mobile body 1 slipping down the staircase after the falling. Alternatively or additionally, forming a mechanical locking structure on the undersurface of the surface layer material 132 makes it possible to suppress slippage of the mobile body 1 on a slippery ground after falling in a case where the mobile body 1 falls in the middle of the movement on the slippery ground such as a snow surface. Examples of an applicable locking structure may include a nail-shaped part or an irregular part.

Further, the front and rear leg mechanisms 12a and 12b in the contracted state are configured to allow the leg tip 123 to be located above the undersurface of the buffer 13 during the maximum compression (FIG. 3B). This makes it possible to avoid the front and rear leg mechanisms 12a and 12b interfering with the operation of the buffer 13, and thus to sufficiently obtain effects by the buffer 13.

The front and rear leg mechanisms 12a and 12b are configured to be brought into an evacuated state in a case where detection is made that the movable unit 12 is in an out-of-control state during the movement of the mobile body 1 by the movable unit 12, i.e., during walking by the front and rear leg mechanisms 12a and 12b. This enables the buffer 13 attached to the undersurface of the mobile body main body 11 to receive the impact of the falling, thus making it possible to achieve absorption of the impact. Here, the front and rear leg mechanisms 12a and 12b located above the buffer 13, specifically, the leg tip 123 of each of the front and rear leg mechanisms 12a and 12b located above the undersurface of the buffer 13 during the maximum compression (FIG. 3B) makes it possible to suppress application of the impact upon falling to the front and rear leg mechanisms 12a and 12b.

In addition, both of the front and rear leg mechanisms 12a and 12b are configured to be brought into the contracted state when the movable unit 12 is brought into the evacuated state. This enables a state of the movable unit 12 upon a collision to be compact, and enables reduction in the number of switchable states, thus making it possible to simplify the control.

Further, providing the receiving part 133 for the fixture f on the surface layer material 132 having a relatively high Young's modulus makes it possible to implement a structure for fixing the buffer 13 by using the smaller number of components while ensuring tightening intensity by the fixture f.

In the present embodiment, a control is performed to bring the front and rear leg mechanisms 12a and 12b into an evacuated state in a case where detection is made that the movable unit 12 is in an out-of-control state during the movement of the mobile body 1 by the movable unit 12. The control during the out-of-control is not limited thereto; the movable unit 12, i.e., both of the front and rear leg mechanisms 12a and 12b may be brought into a power loss state. For example, power supply may be cut off to the actuators m1 and m2 of the front and rear leg mechanisms 12a and 12b.

As described above, the front and rear leg mechanisms 12a and 12b are configured to be brought into the power loss state in a case where detection is made that the movable unit 12 is in the out-of-control state during the movement of the mobile body 1. This causes the buffer 13 attached to the undersurface of the mobile body main body 11 to absorb an impact upon falling, thus making it possible to achieve absorption of the impact. Here, the front and rear leg mechanisms 12a and 12b being in the power loss state makes it possible to suppress application of excessive force upon falling to the front and rear leg mechanisms 12a and 12b.

Further, in the present embodiment, the Young's modulus of the deep layer material 131 is set lower than that of the surface layer material 132. However, a relationship in the Young's modulus between the materials 131 and 132 is not limited thereto, and the Young's modulus of the surface layer material 132 may also be lowered. Examples of a material applicable to the surface layer material 132 in this case may include α GEL®. Employing the α GEL ® for the material of the surface layer material 132 makes it possible not only to increase the freedom of selection of the material but also to suppress a retroaction after a collision more reliably.

1.5. Descriptions of Various Modification Examples (1.5.1. First Modification Example)

FIG. 5 is a schematic diagram illustrating a state of the mobile body 1 according to a first modification example of the present embodiment in a case where the front leg mechanism 12a and the rear leg mechanism 12b are each in an evacuated state.

In the first modification example, when the front leg mechanism 12a and the rear leg mechanism 12b are brought into an evacuated state, the respective proximal joints j1 provided in the front leg mechanism 12a and the rear leg mechanism 12b are rotated in the same direction, and the distal joint j2 of the front leg mechanism 12a is rotated in a direction opposite to the direction of the proximal joint j1. Specifically, the respective proximal joints j1 of the front leg mechanism 12a and the rear leg mechanism 12b are rotated rearward in the moving direction D of the mobile body 1 from the extended state illustrated in FIGS. 1A and 1B, and the distal joint j2 of the front leg mechanism 12*a* is rotated forward in a direction opposite to the direction of the proximal joint j1.

As described above, when the evacuated state is employed, respective first joints j of the front leg mechanism 12*a* and the rear leg mechanism 12*b* are rotated in the same direction, and the distal joint j2 of the front leg mechanism 12*a* is rotated in a direction opposite to the direction of the proximal joint j1. This makes it possible to suppress forward rotation of the mobile body 1 caused by a retroaction after a collision.

Here, in the first modification example, when the evacuated state is employed, the front leg mechanism 12*a* is folded, whereas the rear leg mechanism 12*b* is brought into a rearward thrown state. This obtains an effect of being able to suppress the forward rotation of the mobile body 1 more reliably by using the weight of the rear leg mechanism 12*b*.

(1.5.2. Second Modification Example)

FIG. 6 is a schematic diagram illustrating a state of the mobile body 1 according to a second modification example of the present embodiment in a case where the front leg mechanism 12*a* and the rear leg mechanism 12*b* are in an evacuated state.

In the second modification example, the respective proximal joints j1 of the front leg mechanism 12*a* and the rear leg mechanism 12*b* are rotated forward in the moving direction D of the mobile body 1 from the extended state illustrated in FIGS. 1A and 1B, and the distal joint j2 of the rear leg mechanism 12*b* is rotated rearward in a direction opposite to the direction of the proximal joint j1.

As described above, when the evacuated state is employed, the front leg mechanism 12*a* is thrown forward, whereas the rear leg mechanism 12*b* is brought into a folded state, thereby causing the front leg mechanism 12*a* to shift a fulcrum of a rotational moment. This obtains an effect of suppressing the forward rotation of the mobile body 1 more reliably by using a retroaction after a collision.

(1.5.3. Third Modification Example)

FIG. 7 is a schematic diagram illustrating a state of the mobile body 1 according to a third modification example of the present embodiment in a case where the front leg mechanism 12*a* and the rear leg mechanism 12*b* are in an evacuated state.

In the third modification example, when the evacuated state is employed, the respective proximal joints j1 of the front leg mechanism 12*a* and the rear leg mechanism 12*b* are rotated in directions opposite to each other. Specifically, the respective proximal joints j1 of the front leg mechanism 12*a* and the rear leg mechanism 12*b* are rotated in such directions that the respective first thigh parts 121 and 121 of the leg mechanisms 12*a* and 12*b* are away from each other. That is, the proximal joint j1 of the front leg mechanism 12*a* is rotated forward in the moving direction D of the mobile body 1, whereas the proximal joint j1 of the rear leg mechanism 12*b* is rotated rearward.

As described above, when the evacuated state is employed, the respective proximal joints j1 of the front leg mechanism 12*a* and the rear leg mechanism 12*b* are rotated in opposite directions. This enables the forward rotation of the mobile body 1, which is caused by a retroaction after a collision, to be less likely to occur.

Here, in the third modification example, the respective proximal joints j1 of the front leg mechanism 12*a* and the rear leg mechanism 12*b* are rotated about an axis perpendicular to the moving direction D of the mobile body 1 in such directions that the respective first thigh parts 121 and 121 of the leg mechanisms 12*a* and 12*b* are away from each other. This allows the front and rear leg mechanisms 12*a* and 12*b* to protrude forward and rearward of the mobile body main body 11, thus making it possible to inhibit the forward rotation of the mobile body 1.

(1.5.4. Fourth Modification Example)

FIG. 8 is a schematic diagram illustrating a state of the mobile body 1 according to a fourth modification example of the present embodiment in a case where the front leg mechanism 12*a* and the rear leg mechanism 12*b* are in an evacuated state.

In the fourth modification example, when the evacuated state is employed, the respective proximal joints j1 of the front leg mechanism 12*a* and the rear leg mechanism 12*b* are rotated to allow the respective leg tips 123 and 123 of the leg mechanisms 12*a* and 12*b* to be positioned above the proximal joints j1.

As described above, when the evacuated state is employed, the respective proximal joints j1 of the front leg mechanism 12*a* and the rear leg mechanism 12*b* are rotated to allow the respective leg tips 123 and 123 of the leg mechanisms 12*a* and 12*b* to be positioned above the proximal joints j1. This makes it possible to suppress application of an impact upon falling to the front and rear leg mechanisms 12*a* and 12*b*.

(1.5.5. Fifth Modification Example)

FIG. 9 is a schematic diagram illustrating a state of the mobile body 1 according to a fifth modification example of the present embodiment in a case where the front leg mechanism 12*a* and the rear leg mechanism 12*b* are in an evacuated state.

In the fifth modification example, there is provided, in addition to the configurations of the movable unit 12 illustrated in FIGS. 1A and 1B, a third joint j3 that is rotatably coupled to each of the front leg mechanism 12*a* and the rear leg mechanism 12*b* about an axis that is parallel to the moving direction D of the mobile body 1. In the present embodiment, the third joint j3 corresponds to a "proximal joint".

Then, in the fifth modification example, when the evacuated state is employed, respective third joints j3 and j3 are rotated about the parallel axis in the front leg mechanism 12*a* and the rear leg mechanism 12*b* in such directions that the pair of right and left leg mechanisms are away from each other. Specifically, as for the front leg mechanisms 12*a*, the third joints j3 are rotated to allow the pair of leg mechanisms 12*a* and 12*a* to open outward. As for the rear leg mechanisms 12*b*, the third joints j3 are rotated to allow the pair of leg mechanisms 12*b* and 12*b* to open outward.

As described above, in each of the front leg mechanisms 12*a* and the rear leg mechanisms 12*b*, the respective third joints j3 and j3 provided in the pair of right and left leg mechanisms (e.g., front leg mechanisms 12*a* and 12*a*) are rotated about the axis parallel to the moving direction of the mobile body 1 in such directions that the right and left leg mechanisms are away from each other. This allows the front and rear leg mechanisms 12*a* and 12*b* to protrude rightward and leftward of the mobile body main body 11, thus making it possible not only to suppress the forward rotation of the mobile body 1 but also to inhibit sideward rotation (tumbling into such a state that the side of the mobile body main body 11 is grounded).

2. Second Embodiment

<2.1. Configuration and Operation of Mobile Body>

FIGS. 10A and 10B are cross-sectional view of configurations of the mobile body main body 11 and the buffer 13 of the mobile body 1 according to a second embodiment of the present disclosure using a cross-section similar to that in FIG. 2.

In the present embodiment, the buffer 13 further includes an outer package 134, in addition to the deep layer material 131 and the surface layer material 132.

The outer package 134 is formed by a durable material having a high hardness. The outer package 134 covers the deep layer material 131 and the surface layer material 132, and is configured to be deformable in a direction of compression of the buffer 13. Examples of a material applicable to the outer package 134 may include a rubber-based material (e.g., natural rubber), a resin-based material (e.g., thermoplastic polyurethane resin), and a metal. The buffer 13 includes the fixture f, and the outer package 134 includes the receiving part 133 that receives the fixture f when the buffer 13 is attached to the mobile body main body 11. The receiving part 133 provided on the outer package 134 is implementable as a portion of the outer package 134. Alternatively, the receiving part 133 is also implementable in the mode of an attachment plate, for example, using a different component from the outer package 134.

The outer package 134 includes a deformation-facilitating section that facilitates deformation of the outer package 134 in the compression direction, in order to achieve deformation of the buffer 13 in the compression direction.

In the present embodiment, the deformation-facilitating section of the outer package 134 is implemented as a bellows part 134a provided on a side surface of the outer package 134. FIG. 10A illustrates a state of the bellows part 134a before collision, i.e., before the compression of the buffer 13, and FIG. 10B illustrates a state of a bellows part 134a' after a collision, i.e., after the compression of the buffer 13.

As described above, the outer package 134 is provided that covers the deep layer material 131 and the surface layer material 132, and the receiving part 133 for the fixture f is provided on the outer package 134. This makes it possible not only to protect the deep layer material 131 and the surface layer material 132, but also to ensure high tightening intensity by the fixture f and thus to fix the buffer 13 to the mobile body main body 11 more reliably.

Further, it is possible to cause the deformation-facilitating section to deform the outer package 134 with relatively small force, thus making it possible to suppress inhibition of deformation of the deep layer material 131 upon a collision.

Thus, it is possible to facilitate the deformation of the outer package 134 using a relatively simple configuration of the bellows part 134a.

2.2. Descriptions of Various Modification Examples (2.2.1. First Modification Example)

FIGS. 11A and 11B are cross-sectional views of configurations of the mobile body main body 11 and the buffer 13 of the mobile body 1 according to a first modification example of the present embodiment.

In the first modification example, the deformation-facilitating section of the outer package 134 is implemented as a portion (a slide part 134b), of the outer package 134, configured to be slidable in a compression direction of the buffer 13 with respect to the deep layer material 131. The slide part 134b is implementable by, for example, dividing the outer package 134 into upper and lower portions, providing a slit extending vertically on a side surface of the lower portion, and providing the upper portion with a pin p that penetrates the slit. FIG. 11A illustrates a state of the slide part 134b before the compression of the buffer 13, and FIG. 11B illustrates a state of a slide part 134b' after the compression.

It is possible for the slide part 134b to facilitate the deformation of the outer package 134 using a relatively simple configuration.

(2.2.2. Second Modification Example)

FIGS. 12A and 12B are cross-sectional view of configurations of the mobile body main body 11 and the buffer 13 of the mobile body 1 according to a second modification example of the present embodiment.

In the second modification example, the deformation-facilitating section of the outer package 134 is implemented as a portion (a thin-walled part 134c), of the outer package 134, formed to be locally thinned. The thin-walled part 134c is implementable by, for example, providing a plurality of recesses on the side surface and an undersurface of the outer package 134. In a case where force is applied upon a collision to the buffer 13 from below in a direction of compression, the side surface of the thin-walled part 134c is deformed to increase volumes of the recesses on the side surface thereof, and the undersurface of the thin-walled part 134c is deformed to decrease volumes of the recesses on the undersurface thereof. This makes it possible to follow the deformation of the deep layer material 131. FIG. 12A illustrates a state of the thin-walled part 134c before the compression of the buffer 13, and FIG. 12B illustrates a state of a thin-walled part 134c' after the compression.

It is also possible for the thin-walled part 134c to facilitate deformation of the outer package 134 using a relatively simple configuration.

Further, forming a mechanical locking structure such as a nail-shaped part or an irregular part on the undersurface of the outer package 134, for the overall present embodiment (FIGS. 10A, 10B, 11A, 11B, 12A, and 12B) makes it possible to suppress slippage of the mobile body 1 on a slippery ground after falling in a case where the mobile body 1 falls in the middle of the movement on the slippery ground such as a snow surface.

3. Summary

Some embodiments according to the present disclosure have been described above in detail with reference to the drawings. According to the embodiments of the present disclosure, it is possible not only to achieve buffering but also to suppress a retroaction generated in the mobile body 1 after a collision, thus making possible to protect the mobile body 1 more appropriately from the collision.

It is to be noted that, the foregoing embodiments have exemplified the mobile body 1 including the leg mechanism of the link mechanism structure; however, the technology according to the present disclosure is not limited to the foregoing embodiments. For example, the technology according to the present disclosure is applicable similarly to the mobile body 1 including a leg mechanism of a linear motion leg structure extending and contracting in one direction.

Further, not all the configurations and the operations described in each of the embodiments are essential to the configurations and the operations of the present disclosure. For example, among the components in each of the embodiments, components not described in the independent claims describing the most generic concept of the present disclosure are understood as optional components.

The terms used throughout the specification and the appended claims should be construed as "non-limiting" terms. For example, the terms "include" or "be included" should be construed as "not limited to the example described with the term included". The term "have" is construed as "not limited to the example described with the term have".

The terms used herein include some terms that are used merely for convenience of description and are not used to limit the configuration, the operation, and the like. For example, the term such as "right," "left," "upper," or "lower" merely indicates a direction on the referred drawing. Further, the terms "inner", "outer", and the like merely indicate a direction toward the center of the component of interest and a direction away from the center of the component of interest, respectively. This similarly applies to terms similar to the above-described terms and terms having similar meanings.

The technology according to the present disclosure may have the following configurations. According to the technology of the present disclosure having the following configurations, it is possible, as described above, to provide the mobile body that enables achievement in buffering as well as suppression of a retroaction after a collision. Effects exerted by the technology according to the present disclosure are not necessarily limited to the effects described here, and may be any of the effects described herein.

(1)

A mobile body including:

a mobile body main body;

a movable unit that is attached to the mobile body main body and is configured to provide propulsive force to the mobile body main body; and a buffer attached to a surface of the mobile body main body, in which the buffer includes a deep layer material that covers the surface of the mobile body main body, and a surface layer material provided at a position more distant from the surface of the mobile body main body than the deep layer material, the surface layer material having a modulus of repulsion elasticity lower than the deep layer material.

(2)

The mobile body according to (1), in which the deep layer material has a Young's modulus lower than the surface layer material.

(3)

The mobile body according to (1) or (2), in which the surface layer material is formed by HANENITE®.

(4)

The mobile body according to (1), in which the surface layer material is formed by α GEL®.

(5)

The mobile body according to any one of (1) to (4), in which the deep layer material has a Young's modulus in a range from 5 kPa to 200 kPa.

(6)

The mobile body according to any one of (1) to (5), in which the buffer is attached to an undersurface of the mobile body main body.

(7)

The mobile body according to (6), in which the movable unit includes a leg mechanism configured to be switchable, during movement of the mobile body, between an extended state and a contracted state, and the leg mechanism has a leg tip that, in the contracted state, is located above an undersurface of the buffer during maximum compression.

(8)

The mobile body according to (7), further including a controller configured to control an operation of the movable unit, in which the controller includes a state detection section that detects that the movable unit is in an out-of-control state during the movement of the mobile body by the movable unit, and a power loss control section that controls the leg mechanism to be in a power loss state in a case where detection is made that the movable unit is in the out-of-control state.

(9)

The mobile body according to (7), further including a controller configured to control an operation of the movable unit, in which the controller includes a state detection section that detects that the movable unit is in an out-of-control state during the movement of the mobile body by the movable unit, and an evacuation control section that controls the leg mechanism to be in an evacuated state in a case where detection is made that the movable unit is in the out-of-control state, and the leg mechanism is located above the buffer in the evacuated state.

(10)

The mobile body according to (9), in which the evacuation control section brings the leg mechanism into the evacuated state by switching the leg mechanism to the contracted state.

(11)

The mobile body according to (9), in which the leg mechanism includes a first leg mechanism and a second leg mechanism provided spaced apart from each other in a moving direction of the mobile body, the first leg mechanism and the second leg mechanism include respective first thigh parts coupled to the mobile body main body via respective first joints, and respective second thigh parts coupled to the respective first thigh parts via respective second joints, the first joints are rotatably coupled to the respective first thigh parts about a first axis perpendicular to the moving direction of the mobile body, the second joints are bendably coupled to the respective second thigh parts about a second axis parallel to the first axis, and the evacuation control section, when the leg mechanism is brought into the evacuated state, rotates the respective first joints of the first leg mechanism and the second leg mechanism in same direction, and rotates the second joint of the first leg mechanism in a direction opposite to the first joints.

(12)

The mobile body according to (9), in which the leg mechanism includes a first leg mechanism and a second leg mechanism provided spaced apart from each other, the first leg mechanism and the second leg mechanism are coupled to the mobile body main body via respective proximal joints, and the evacuation control section, when the leg mechanism is brought into the evacuated state, rotates the respective proximal joints of the first leg mechanism and the second leg mechanism in directions opposite to each other.

(13)

The mobile body according to (12), in which the first and second leg mechanisms are provided spaced apart from each other in a moving direction of the mobile body, the respective proximal joints are rotatably coupled to the first leg mechanism and the second leg mechanism about an axis perpendicular to the moving direction of the mobile body, and the evacuation control section, when the leg mechanism is brought into the evacuated state, rotates the respective proximal joints of the first leg mechanism and the second leg mechanism about the perpendicular axis in such directions that the leg mechanisms are away from each other.

(14)

The mobile body according to (12), in which the first and second leg mechanisms are provided spaced apart from each other in a direction perpendicular to a moving direction of the mobile body, the respective proximal joints are rotatably coupled to the first leg mechanism and the second leg mechanism about an axis parallel to the moving direction of the mobile body, and the evacuation control section, when the leg mechanism is brought into the evacuated state, rotates the respective proximal joints of the first leg mechanism and the second leg mechanism about the parallel axis in such directions that the leg mechanisms are away from each other.

(15)

The mobile body according to (9), in which the leg mechanism includes a first leg mechanism and a second leg mechanism provided spaced apart from each other, the first leg mechanism and the second leg mechanism are coupled to the mobile body main body via respective proximal joints, and the evacuation control section, when the leg mechanism is brought into the evacuated state, rotates the respective proximal joints of the first leg mechanism and the second leg mechanism to allow respective leg tips of the leg mechanisms to be positioned above the respective proximal joints.

(16)

The mobile body according to any one of (1) to (15), in which the buffer further includes a fixture that fixes the buffer to the mobile body main body, and the surface layer material includes a receiving part that receives the fixture.

(17)

The mobile body according to any one of (1) to (15), in which the buffer further includes an outer package that covers the deep layer material and the surface layer material and is configured to be deformable in a direction of compression of the buffer, and a fixture that fixes the buffer to the mobile body main body, and the outer package includes a receiving part that receives the fixture.

(18)

The mobile body according to (17), in which the outer package includes a deformation-facilitating section that facilitates deformation of the outer package in the direction of the compression of the buffer.

(19)

The mobile body according to (18), in which the deformation-facilitating section includes, of the outer package, a portion formed in a bellows shape, a portion formed to be locally thinned, or a portion configured to be slidable in the direction of the compression with respect to the deep layer material.

(20)

The mobile body according to any one of (1) to (19), in which the deep layer material includes foamed urethane, PORON®, an air cap, foamed styrene, or a corrugated cardboard.

This application claims the benefit of Japanese Priority Patent Application JP2020-175659 filed with the Japan Patent Office on Oct. 19, 2020, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A mobile body including:

a mobile body main body;

a movable unit configured to provide propulsive force to the mobile body main body, wherein the movable unit is attached to the mobile body main body, the movable unit includes a leg mechanism, the leg mechanism is configured to switch, at a time of movement of the mobile body, between an extended state and a contracted state, and the leg mechanism has a leg tip;

a buffer attached to an undersurface of the mobile body main body, wherein the leg tip, at a time of maximum compression in the contracted state, is above an undersurface of the buffer, and the buffer includes a deep layer material that covers the undersurface of the mobile body main body, and a surface layer material, the surface layer material is at a first position at a first distance from the undersurface of the mobile body main body, the deep layer material is at a second position at a second distance from the undersurface of the mobile body main body, the first distance of the surface layer material is greater than the second distance of the deep layer material, and a modulus of repulsion elasticity of the surface layer material is less than a modulus of repulsion elasticity of the deep layer material; and a controller configured to control an operation of the movable unit, wherein the controller includes:

a state detection section configured to detect that the movable unit is in an out-of-control state at the time of the movement of the mobile body, and a power loss control section configured to control the leg mechanism in a power loss state, based on the detection that the movable unit is in the out-of-control state.

2. The mobile body according to claim 1, wherein a Young's modulus of the deep layer material lower is less than a Young's modulus of the surface layer material.

3. The mobile body according to claim 1, wherein a Young's modulus of the deep layer material is in a range from 5 kPa to 200 kPa.

4. The mobile body according to claim 1, wherein, the controller includes
   an evacuation control section configured to control the leg mechanism in an evacuated state, based on the detection that the movable unit is in the out-of-control state, and
   the leg mechanism is above the buffer in the evacuated state.

5. The mobile body according to claim 4, wherein the evacuation control section is further configured to bring, based on the switch of the leg mechanism to be contracted state, the leg mechanism into the evacuated state.

6. The mobile body according to claim 4, wherein
   the leg mechanism includes a first leg mechanism and a second leg mechanism,
   the first leg mechanism is at a specific distance from the second leg mechanism in a moving direction of the mobile body,
   each of the first leg mechanism and the second leg mechanism includes
      first upper thigh parts coupled to the mobile body main body via first respective proximal joints,
      second upper thigh parts coupled to the mobile body main body via second proximal joints,
      first lower thigh parts coupled to the first upper thigh parts via first distal joints, and
      second lower thigh parts coupled to the second upper thigh parts via second distal joints,
   the first proximal joints and the second proximal joints are rotatably coupled to the first upper thigh parts and the second upper thigh parts, respectively, about a first axis,
   the first axis is perpendicular to the moving direction of the mobile body main body,
   the first distal joints and the second distal joints are bendably coupled to the the first lower thigh parts and the second lower thigh parts, respectively, about a second axis,
   the second axis is parallel to the first axis, and
   the evacuation control section, based on the leg mechanism is in the evacuated state, is further configured to:
      rotate the first proximal joints of the first leg mechanism and the second proximal joints of the second leg mechanism in a first direction; and
      rotate the first distal joints of the first leg mechanism in a second direction opposite to the first direction.

7. The mobile body according to 4, wherein
   the leg mechanism includes a first leg mechanism and a second leg mechanism,
   the first leg mechanism includes a first leg mechanism and a second leg mechanism,
   the first leg mechanism and the second leg mechanism are coupled to the mobile body main body via first proximal joints and second proximal joints, respectively, and
   the evacuation control section is further configured to rotate, based on the leg mechanism is in the evacuated state, the first proximal joints of the first leg mechanism and the second proximal joints of the second leg mechanism in opposite directions.

8. The mobile body according to claim 7, wherein
   the first leg mechanism is at the specific distance from the second leg mechanism in a moving direction of the mobile body,
   the first proximal joints are rotatably coupled to the first leg mechanism about a first axis,
   the second proximal joints are rotatably coupled to the second leg mechanism about the first axis,
   the first axis is perpendicular to the moving direction of the mobile body, and
   the evacuation control section is further configured to rotate, based on the leg mechanism is in the evacuated state, the first proximal joints of the first leg mechanism and the second proximal joints of the second leg mechanism about the first axis in a first direction and a second direction, respectively.

9. The mobile body according to claim 7, wherein
   the first leg mechanism and the second leg mechanism are in a direction perpendicular to a moving direction of the mobile body,
   the first proximal joints are rotatably coupled to the first leg mechanism about a second axis parallel to the moving direction of the mobile body main body,
   the second proximal joints are rotatably coupled to the second leg mechanism about the second axis parallel to the moving direction of the mobile body main body, and
   the evacuation control section is further configured to rotate, based on the leg mechanism is in the evacuated state, the first proximal joints of the first leg mechanism and the second proximal joints of the second leg mechanism about the second axis in a first direction and a second direction, respectively.

10. The mobile body according to claim 4, wherein
   the leg mechanism includes a first leg mechanism and a second leg mechanism,
   the first leg mechanism is at a specific distance from the second leg mechanism,
   the first leg mechanism is coupled to the mobile body main body via first proximal joints,
   the second leg mechanism is coupled to the mobile body main body via second proximal joints, and
   the evacuation control section is further configured to, based on the leg mechanism is in the evacuated state,
      rotate the first proximal joints of the first leg mechanism to position first leg tips of the first leg mechanism above the first proximal joints, wherein the first leg tips include the leg tip; and
      rotate the second proximal joints of the second leg mechanism to position second leg tips of the second leg mechanism above the second proximal joints.

11. The mobile body according to claim 1, wherein
   the buffer further includes a fixture configured to fix the buffer to the mobile body main body,
   the surface layer material includes a receiving part, and
   the receiving part is configured to receive the fixture.

12. The mobile body according to claim 1, wherein
   the buffer further includes
      an outer package that covers the deep layer material and the surface layer material, wherein
         the outer package is configured to deform in a direction of compression of the buffer; and a fixture configured to fix the buffer to the mobile body main body, and the outer package includes a receiving part configured to receive the fixture.

13. The mobile body according to claim 12, wherein the outer package further includes a deformation-facilitating section, and the deformation-facilitating section is configured to deform the outer package in the direction of the compression of the buffer.

14. The mobile body according to claim 13, wherein the deformation-facilitating section further comprises one of a portion in a bellows shape, a portion that is locally thinned, or a portion configured to slide in the direction of the compression with respect to the deep layer material.

15. The mobile body according to claim 1, wherein the deep layer material includes one of foamed urethane, an air cap, foamed styrene, or a corrugated cardboard.

* * * * *